United States Patent
Hess et al.

[15] 3,671,403
[45] June 20, 1972

[54] PROCESS FOR COKING PUMPABLE ANIMAL AND DAIRY WASTES

[72] Inventors: Howard V. Hess, Glenham; Edward L. Cole, Fishkill, both of N.Y.

[73] Assignee: Texaco Inc., New York, N.Y.

[22] Filed: Sept. 9, 1970

[21] Appl. No.: 70,775

[52] U.S. Cl.................201/25, 201/27, 201/35, 110/7, 210/63, 210/71
[51] Int. Cl........................................C10b 53/02
[58] Field of Search..............201/25, 23, 27, 35; 210/63, 210/71, 10; 110/7, 8

[56] References Cited

UNITED STATES PATENTS

| | | | |
|---|---|---|---|
| 2,793,104 | 5/1957 | Rees | 201/25 X |
| 3,155,611 | 11/1964 | Porteous | 210/71 X |
| 3,272,740 | 9/1966 | Gitchel et al | 110/8 X |
| 3,275,547 | 9/1966 | Bucksteeg et al | 201/25 X |

Primary Examiner—Norman Yudkoff
Assistant Examiner—D. Edwards
Attorney—Thomas H. Whaley and Carl G. Reis

[57] ABSTRACT

Animal and dairy wastes are converted to deodorized coke suitable for use as fertilizer or soil conditioner, an aqueous odor-free effluent having low chemical oxygen demand and reduced phosphorus content and an odorless gas suitable for discharge to the atmosphere. The wastes are coked in the liquid phase under pressure to produce wet coke and a malodorous, gas-containing effluent high in chemical oxygen demand. The wet coke is treated with pressurized hot air to remove liquids therefrom and the air stream is mixed with the effluent and the mixture is oxidized, brought into heat exchange relationship with incoming wastes and then discharged.

5 Claims, 1 Drawing Figure

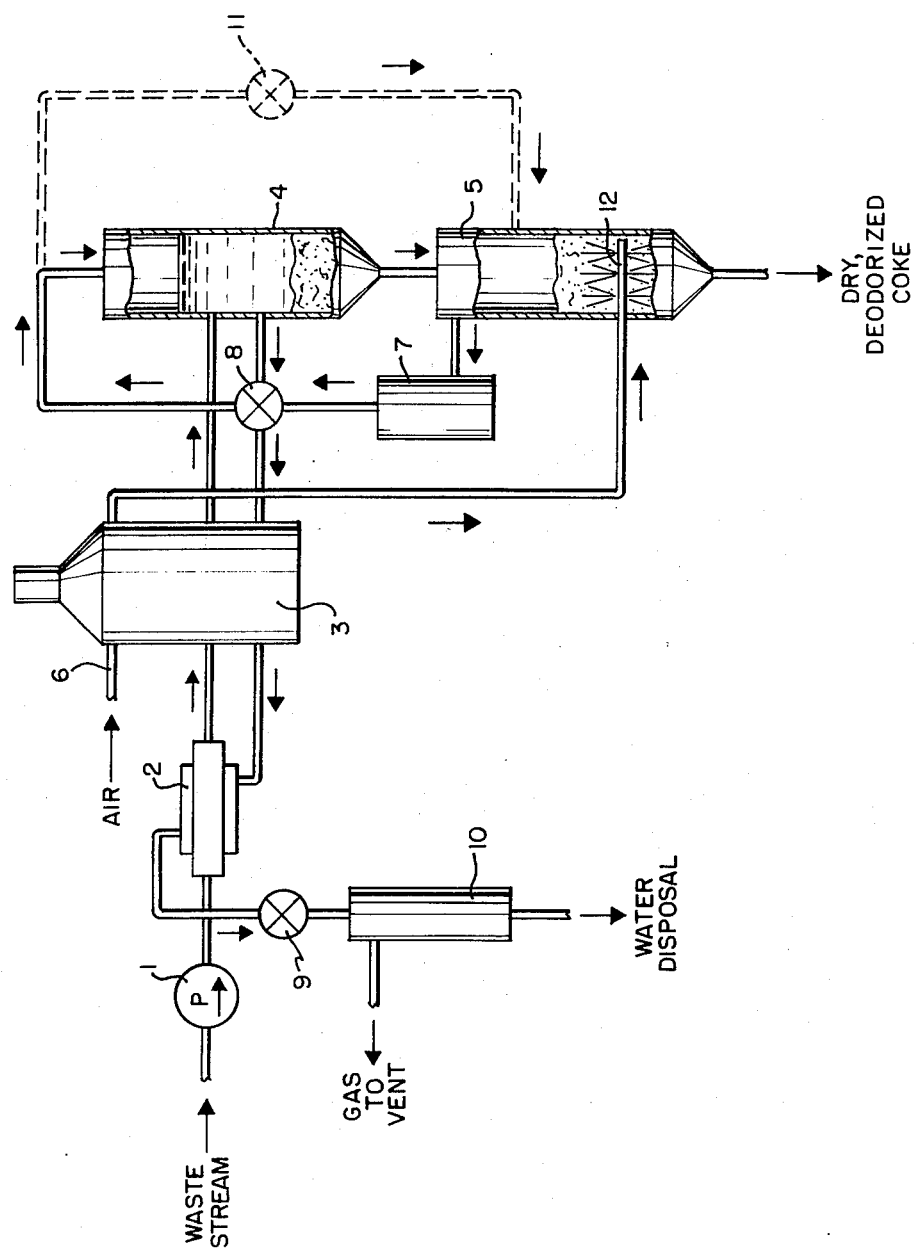

PROCESS FOR COKING PUMPABLE ANIMAL AND DAIRY WASTES

BACKGROUND OF THE INVENTION

1. Field of the Invention

This invention relates to a new and improved process for treating animal and dairy wastes, and, more particularly, to a more efficient and economical means of treating liquid animal wastes than the bacterial decomposition or other presently utilized processes.

The scope of the problem of animal and dairy waste disposal has broadened in recent years because water pollution abatement regulations now demand more effective control of waste discharge to streams and also because animal production industries are continuously being expanded to provide food for an ever-increasing world population.

Description of the Prior Art

In earlier times, and now around small dairies and the like, the waste was collected and spread on the soil for fertilizer. However, the concentration of waste from feed lot operations involving up to 10,000 animals each and larger, does not allow this method of disposal; for example, an average sample of cattle waste contains about 90 percent water so that transportation charges for hauling the waste any distance for fertilizer value would become prohibitive.

In a recently developed process organic wastes such as potato peelings, orange peelings, whey liquid, newsprint, sawdust, etc. in water slurries have been coked under pressure to produce an odorless coke, a gas which is suitable for venting to the atmosphere, and a liquid effluent which is not malodorous and which is considerably reduced in COD (Chemical Oxygen Demand). Attempts to apply this process to the purification of animal wastes, however, have not been successful since the resulting effluent gases and coke are very malodorous. The liquid effluent, while being somewhat reduced in COD by coking, still contains dissolved organic compounds which contribute to COD and make it undesirable for discharge into receiving lakes or streams. In addition the liquid effluent has a bad odor due to these dissolved organic compounds.

SUMMARY OF THE INVENTION

In accordance with the invention a pumpable animal or dairy waste stream is preheated, coked to form a gas phase, a liquid phase (or aqueous coker effluent) and a wet coke phase; the wet coke phase is withdrawn intermittently, maintained at a slightly superatmospheric pressure and deodorized with pressurized hot air, thereby simultaneously drying the coke. The new moist hot air is compressed and mixed with the aqueous coker effluent and the product gases with the resulting mixture being oxidized to destroy odor forming constituents therefrom. This oxidized stream is then heat exchanged with the incoming feed stream and the thus cooled effluent composed of gases and liquids can be finally disposed of. The effluent is low in phosphorus and accordingly does not contribute to algae growth in the receiving body of water. The coke which is recovered is relatively high in phosphorus content which enhances its value as a soil conditioner and fertilizer.

The process of the invention will be better understood by reference to the accompanying FIGURE showing diagrammatically a preferred embodiment of the present invention.

To provide a basis for showing the advantages of the present process over the coking process above-outlined, a sample of cattle waste obtained from a commercial dairy and having a chemical oxygen demand of 110,884 mg/$O_2$/liter and an organic carbon content of 8.5 percent was coked in a coke drum at 550° F. and 1,000 psig. Treatment of this cattle waste according to the above process produced the following results (except for the oxidation step):

TABLE I

| | Weight, grams | Yield, weight percent basis charge | COD, mg./$O_2$ liter | Percent | | | | | | pH | Gross heat of combustion, B.t.u./bbl. | Coke surface area, M2/g |
|---|---|---|---|---|---|---|---|---|---|---|---|---|
| | | | | C | S | N | P | K | H | | | |
| Liquid phase coking of cow manure: | | | | | | | | | | | | |
| Charge—cow manure | 710 | | 110,884 | 8.5 | | | | | | | | |
| Products from treating at 550° F., 1,150 p.s.i.g., 2 hours: | | | | | | | | | | | | |
| Aqueous effluent | 530 | 74.7 | 72,076 | 2.6 | 0.014 | 0.23 | 0.003 | 0.30 | | 5 | | |
| Wet coke | 140 | 19.7 | | | | | | | | | | |
| Gas (95% $CO_2$) | 28.4 | 4.0 | | | | | | | | | | |
| Material balance | 698.4 | 98.6 | | | | | | | | | | |
| Dry coke | 56 | 7.9 | | 60.0 | 0.18 | 3.8 | 0.66 | 0.39 | 5.8 | 5 | 12,295 | 6 |
| Products from treating at 600° F., 1,875 p.s.i.g., 2 hours: | | | | | | | | | | | | |
| Aqueous effluent | 531 | 74.8 | 64,547 | 2.2 | 0.012 | 0.23 | 0.002 | 0.36 | | | | |
| Wet coke | 150 | 21.2 | | | | | | | | | | |
| Gas (95% $CO_2$) | 33 | 4.6 | | | | | | | | | | |
| Material balance | 714 | 100.6 | | | | | | | | | | |
| Dry coke | 64 | 9.0 | | 55.2 | 0.23 | 3.4 | 1.25 | 0.54 | 5.0 | | 11,812 | 4 |

In looking at the results shown in the table it becomes apparent that the bulk of the phosphorus is rejected in the coke product. In the run at 550° F., 95 percent of the phosphorus and 60 percent of the nitrogen is removed from the system in the coke product. At 600° F., 98 percent of the phosphorus and 66 percent of the nitrogen is removed in the coke. 53 percent of the sulfur is removed with the coke at 550° F. and 66 percent at 600° F.

The potassium content of the waste stream, as might be expected from the solubility of potassium salts in water, is largely retained in the aqueous effluent from the coking operation. At 550° F. coking temperature 89 percent of the potassium remains in the aqueous effluent, at 600° F. coking temperature 86 percent.

It will be noted from Table I that the carbon distribution from a run at 550° F. is:

| | Grams | % |
|---|---|---|
| Aqueous Effluent | 2.24 | 26.4 |
| Dry Coke | 4.74 | 56.0 |
| Gas | 1.5 | 17.6 |
| Total: | 8.48 | 100.0 |

From the run at 600° F.:

| | Grams | % |
|---|---|---|
| Aqueous Effluent | 1.81 | 21.4 |
| Dry Coke | 4.97 | 58.6 |
| Gas | 1.70 | 20.0 |
| total: | 8.48 | 100.0 |

It can be seen from the above (the carbon material balance from feed to products is 99.7 percent) that between 21.4 and 26.4 percent of the carbon remains dissolved in the aqueous effluent. These carbon-containing water soluble compounds are low molecular weight substances not subject to coking under the rather mild coking conditions employed. These materials of course contribute to the high chemical oxygen demand of the aqueous effluent coming from the coking operation. At 550° F. the aqueous effluent from the coker still contains 56 percent of the COD of the charge and at 600° F. the aqueous effluent from the coker contains 50.5 percent of the COD of the charge. This high COD of the aqueous effluent from the coking operation also results in the effluent having a very bad odor. This odor as well as the high COD makes it mandatory that additional treating be carried out before the effluent could be dumped into waterways. The wet coke produced in the operation, because it is wet with the aqueous coker effluent, also has a foul odor and thus should also be treated before use as fertilizer or soil conditioner. Gases produced in the coking operation, even though they are roughly 95 percent $CO_2$, also possess a foul odor and thus would require treatment before venting to the atmosphere.

In the embodiment of invention as shown in the figure, the waste stream is pumped up to system pressure in pump 1 through the heat exchanger 2 where it is in heat exchange with the oxidized effluent and through the heater 3 where the cokable materials are coked and from there to a decanter (held at system pressure) 4 where the system separates into a gas phase, a liquid phase (called aqueous coker effluent) and a wet coke phase. The wet coke phase is drawn down intermittently into vessel 5 which is maintained slightly above atmospheric pressure. Coke is now in the vessel 5 and to dry it and remove malodorous constituents, air is brought in at slightly above atmospheric pressure, preferably 30 to 60 psig, through the top part of heater 3 where it is heated to 250°–350° F. (a temperature sufficient to dry and deodorize the wet coke) and passes through the sparger 12 shown at the bottom of vessel 5. The temperature range indicated suffices to dry and to deodorize the wet coke but is not sufficiently hot to burn the coke. The flow rate of hot air through the coke is sufficient to expand the coke bed and maintain it in an expanded condition above the sparger. In any case, sufficient air is used so that there will be an excess of oxygen available for burning the COD from the aqueous effluent and gases. Next, dry, deodorized coke is removed intermittently from the bottom of vessel 5 for use as fertilizer or soil conditioner. The warm, moist and now, smelly, air from vessel 5 is compressed in compressor 7 to system pressure and mixed with aqueous coker effluent from vessel 4 and gas from vessel 4 in mix valve 8 and passes through the lower part of heater 3. This air-water-gas system is oxidized in heater 3 whereby the chemical oxygen demand is removed from the gas and the aqueous coker effluent while the odor-forming constituents are destroyed. This oxidized stream is passed through heat exchanger 2 in heat exchange with the raw waste feed and thence through a pressure reducing valve 9 to a gas liquid separator 10. The gases and liquid from separator 10 may be discharged to the atmosphere and ditch respectively.

In another embodiment shown in dotted lines, the gas from vessel 4 can be passed through a pressure reducing valve 11 into the vessel 5 where it is mixed with the gases obtained in drying the coke.

The effluent from the coker (produced at conditions of 550° F. and 1,150 psig) has been oxidized with air at 550° F. and autogenous pressure to produce an oxidized effluent with a COD of 3802 mg/$O_2$/liter and a pH 7.6. In considering the coker effluent alone (which had a COD of 72,076 mg/$O_2$/liter) this represents a COD reduction of 94.7 percent or basing it back on the COD of the charge it represents a reduction of upwards of 96 percent. The odor is also substantially removed. This oxidation was carried out in a batch operation. Operation on a continuous basis with excess air leads to essentially complete removal of COD.

The process of the invention is also suitable for treatment of other animal wastes such as pig wastes. The effluent from poultry feeding units can likewise be handled. A portion of the water produced from the described operation also can be used to wash down dairy barns, feed lots, and the like and then, in a sense, recycled through the whole system.

What is claimed is:

1. A process for converting pumpable animal waste to deodorized coke, odor-free effluent of low phosphorus content and odorless gases comprising bringing said waste into heat exchange relationship with said effluent to preheat the same, coking said preheated waste in a heating zone under pressure to thereby form a wet coke bed, a product gases phase and an aqueous effluent, separating said wet coke, contacting said coke with pressurized hot air to deodorize and dry same, compressing said air, mixing said air with said aqueous effluent and said product gases, oxidizing the resulting mixture to destroy odor-forming constituents present therein to thereby produce said odor-free effluent and said odorless gases.

2. The process according to claim 1, wherein said oxidation is carried out at about 550° F. under autogenous pressure.

3. The process according to claim 1, wherein said pressurized hot air is heated by passage through said heating zone to a temperature of from about 250° F. to 350° F.

4. The process according to claim 1, wherein said hot air is passed over said wet coke bed at a flow rate sufficient to expand said coke bed and maintain same in an expanded condition.

5. The process according to claim 1, wherein sufficient air is used to provide excess oxygen.

* * * * *